Jan. 15, 1963  K. B. HARMON  3,073,182
TRANSMISSION
Filed June 10, 1959  3 Sheets-Sheet 1

INVENTOR.
Kenneth B. Harmon
BY
A. M. Seiter
ATTORNEY

INVENTOR.
Kenneth B. Harmon
BY A. M. Heiter
ATTORNEY

United States Patent Office 3,073,182
Patented Jan. 15, 1963

3,073,182
TRANSMISSION
Kenneth B. Harmon, Indianapolis, Ind., assignor to General Motors Corporation, Detroit, Mich., a corporation of Delaware
Filed June 10, 1959, Ser. No. 819,347
26 Claims. (Cl. 74—677)

This invention relates to a torque converter and more particularly to a dual turbine split torque fluid torque converter transmission.

This transmission has a dual turbine torque converter having two turbines which transmit torque throughout the range of operation from stall to coupling. The input shaft is connected to the torque converter pump and a sun gear of the first planetary gear unit. The first turbine is connected to the carrier of the first planetary gear unit and the output shaft. The second turbine is connected to the sun gear of the second planetary gear unit which has a carrier connected to ground through a one-way clutch to prevent reverse rotation and a ring gear connected to the output shaft. The second turbine is also connected through a one-way clutch during relative forward rotation of the second turbine to drive the ring gear of the first planetary gear unit. Throughout the range of operation of this transmission the first turbine is directly connected to the output shaft. In the first portion of the range of operation from stall to about .15 to .25 speed ratio of the output shaft to the input shaft, the second turbine is connected to the output through the second planetary gear set which acts as a reversing reduction drive to provide increased output torque. At higher speed ratios the second turbine is directly connected through a one-way clutch to the first planetary gear set and in conjunction with the sun gear driven by the input shaft provides a direct drive from the second turbine and the input shaft for a split torque drive assisting the first turbine drive.

An object of the invention is to provide in a torque converter transmission having two turbines, the first turbine rotating forwardly throughout the range of operation and the second rotating reversely through a first portion of the range of operation and thereafter forwardly, a direct connection from the first turbine to the output shaft and a reversing connection from the second turbine to the output shaft operable when the second turbine rotates in the reverse direction and a forward connection from the second turbine to the output shaft operative when the second turbine rotates in a forward direction.

Another object of the invention is to provide in a torque converter transmission having two turbines, the first turbine rotating forwardly at all times and the second turbine rotating reversely from stall and through a first range of operation and forwardly during a second range of operation to the converter coupling stage, a direct connection from the first turbine to the output shaft, a reverse reduction gearing connection from the second turbine to the output shaft operative when the second turbine rotates in a reverse direction, and a connection from the second turbine and the input shaft operative through differential gearing to transmit torque from the second turbine and the input shaft to the output shaft.

Another object of the invention is to provide in a torque converter transmission having two turbines, one of which transmits torque forwardly throughout the complete range of converter operation and the second of which transmits torque reversely during operation of the torque converter in the lower range of output to input speed ratios and transmits torque forwardly in the upper range of speed ratios having a first and a second planetary gear unit, the first turbine being connected to the carrier of the first planetary gear unit and the output shaft, the second turbine having a reverse drive connection to the sun gear of a second planetary gear unit having a carrier held only against reverse rotation and a ring gear connected to the output shaft and a forward drive connection from the second turbine through a one-way clutch to the ring gear of the first planetary gear unit acting with the input driven sun gear of the first planetary gear unit to provide a split torque drive.

These and other objects of the invention will be more apparent from the following description and drawing of the preferred embodiments of the invention.

FIGURES 3a, b and c diagrammatically show the preferred range of torque converter blade angles, FIG. 3a the lower limit, FIG. 3b the preferred blade angles and FIG. 3c the upper limit.

Figure 4:
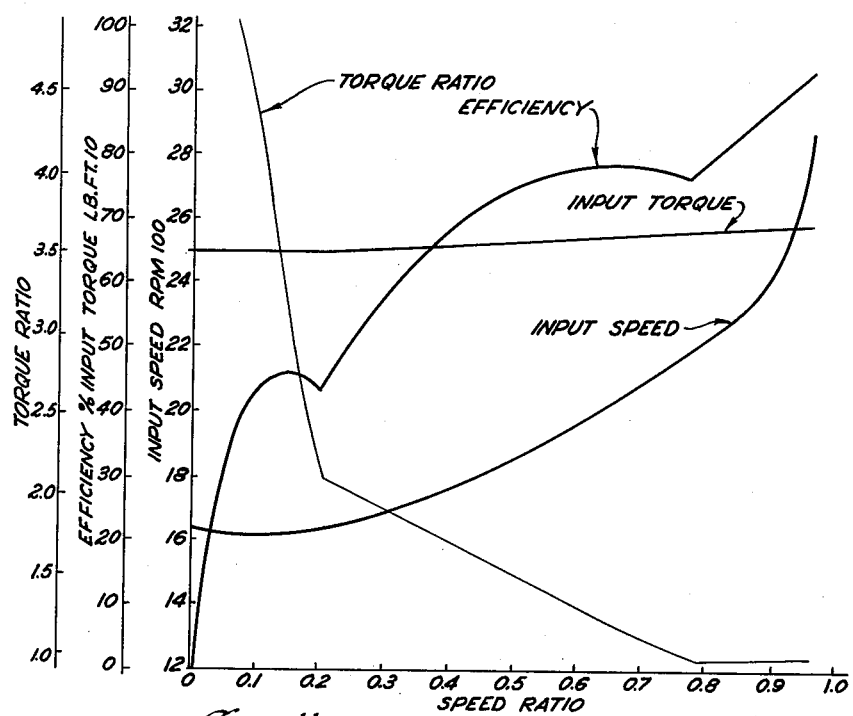

FIG. 4 shows the performance curves.

Figure 5:
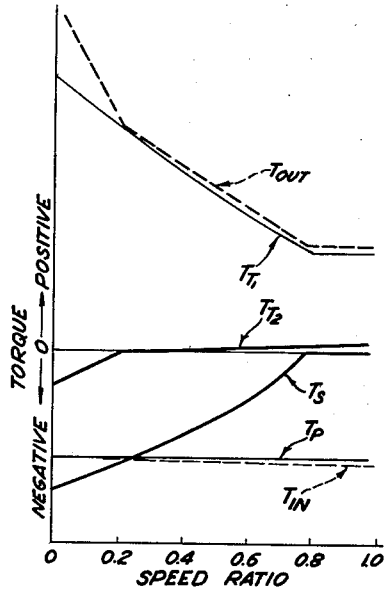

FIG. 5 shows the torque curves.

Figure 6:
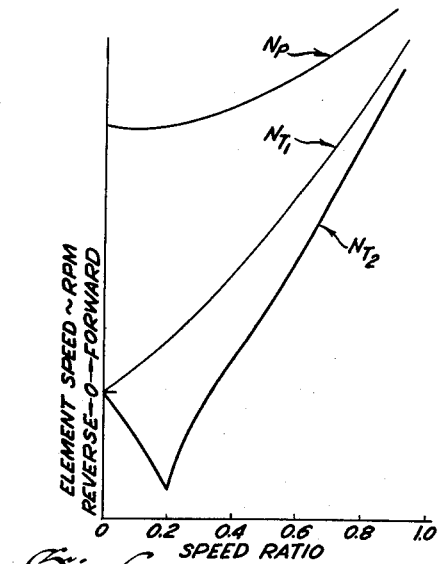

FIG. 6 shows the speed curves.

Figure 1:
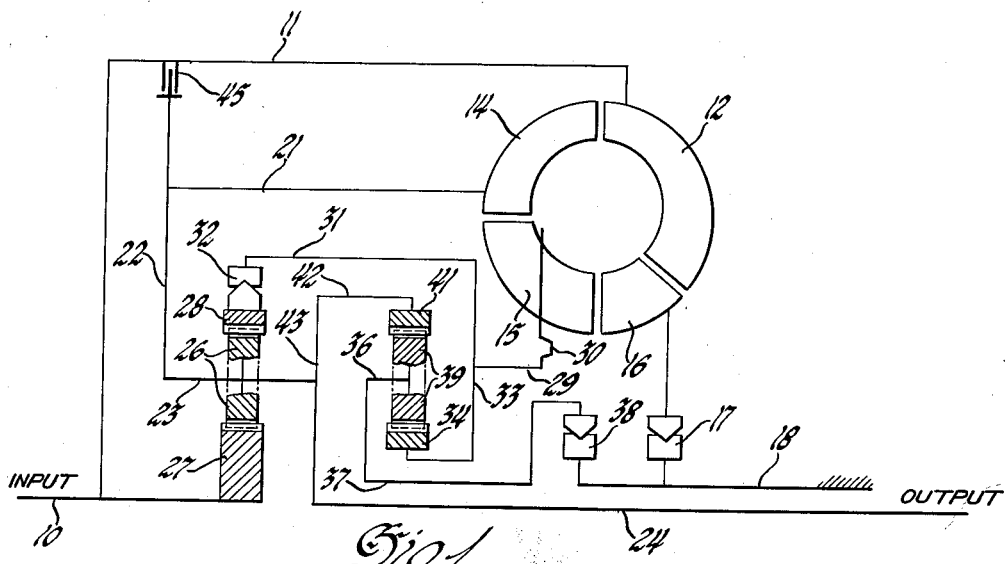
FIG. 1 illustrates diagrammatically the preferred embodiment of the applicant's dual turbine split torque transmission.

The split torque dual turbine torque converter illustrated in FIG. 1 employs a four element fluid torque converter and two planetary gear units arranged to connect the first turbine directly to the output shaft and the second turbine to the output shaft through a reduction gear ratio during a first range of operation and provide a split torque drive in a second range of operation. In the transmission the input shaft 10 is connected by the torque converter housing 11 to drive the torque converter pump 12. The fluid torque converter unit has a plurality of bladed rotor members having inner and outer shells forming when assembled the inner and outer torus shells which confine the fluid flow in the usual torque converter torus flow path. The rotor members preferably consist of a pump 12 which circulates fluid in the torus path, a first turbine 14, a second turbine 15 and a stator 16 arranged in that sequence. The stator 16 is connected through a one-way brake 17 mounted on the ground sleeve 18 to prevent reverse rotation of the stator and to permit forward rotation. The first turbine 14 is connected by a cylindrical member 21 and disc 22 to the carrier 23 of the first planetary gear unit. The carrier 23 is connected to the output shaft 24. The first planetary gear unit has a carrier 23 having planetary pinions 26 mounted thereon which mesh with a sun gear 27 fixed to the input shaft 10 and a ring gear 28. The second turbine 15 is connected by member 29, hub 33, cylindrical member 31 and a one-way clutch 32 to drive the ring gear 28 when the second turbine 15 rotates forwardly but to permit reverse rotation of the second turbine relative to the ring gear. The second turbine 15 is also connected by a disc member 33 to the sun gear 34 of the second planetary gear unit. The blades of the second turbine 15 are, for more efficient operation, preferably mounted on a crank 30 so that the angle of the second turbine blades may be changed during the operation of the converter by a suitable control system as shown for example in British Patent No. 750,788, since in this arrangement there is a wider variation in the optimum blade angle of the second turbine than in the other bladed members. The second planetary gear unit has a carrier 36 connected by a sleeve shaft 37 and one-way brake 38 which prevents reverse rotation of the carrier 36. The carrier 36 has mounted thereon a plurality of planetary pinions 39 meshing with the sun gear 34 and a ring gear 41 which is connected by sleeve shaft 42 and disc member 43 to the output shaft 24. Direct drive may be provided by a direct drive clutch 45 located between rotating housing 11 and carrier 23 to connect input shaft 10 to output shaft 24 for direct mechanical drive.

In this transmission the input drives the pump 12 in a conventional manner. The first turbine 14 and the second turbine 15 operate, throughout the full range of operation of the converter, from stall to coupling. The first turbine 14 is rotated by the fluid in a forward direction at all times. The second turbine 15 is rotated in a reverse direction in a lower range of speed ratios and in the forward direction in a higher range of speed ratios. The first turbine 14 will at all times be connected to the carrier 23, to the output shaft 24, to provide torque multiplication. The second turbine will during the low range of speed ratios drive the sun gear 34 of the second gear unit reversely and thus drive the ring gear 41 forwardly at a reduced speed to add to the output torque of the output shaft 24. In a second and higher range of speed ratios the second turbine 15 will rotate at a reducing backward speed and then forwardly causing planetary carrier 36 to freewheel at the one-way brake 38. Then as the forward speed increases the second turbine will, through the sleeve shaft 31 and the one-way clutch 32, drive the ring gear 28 of the first gear unit. When the second turbine 15 drives the ring gear 28, this drive in conjunction with the input driven sun gear 27 will provide a split torque drive through the planetary gear 26 to the carrier 23 and output shaft 24.

Figure 2:
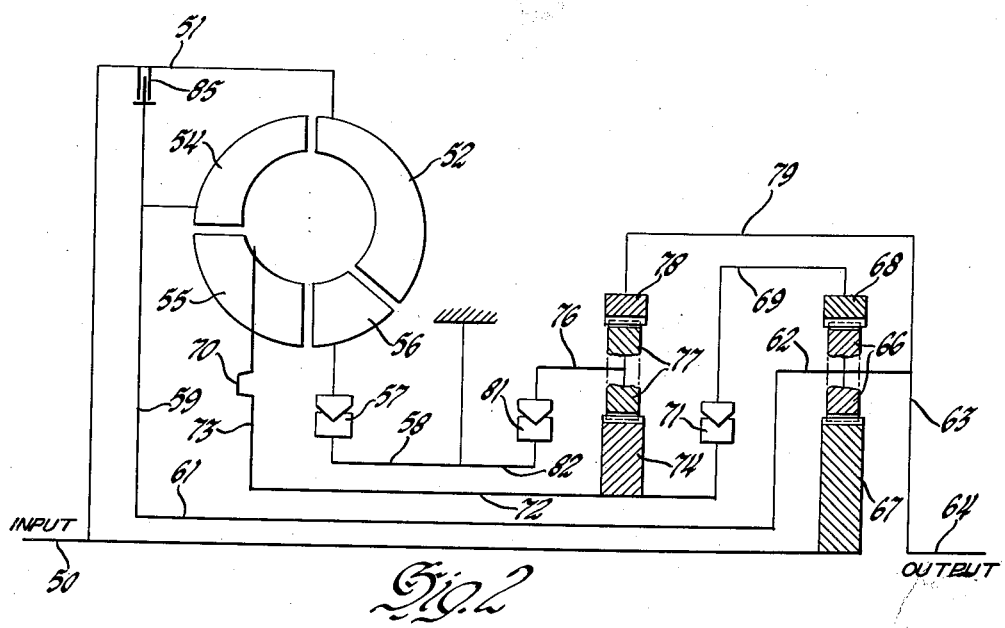
FIG. 2 illustrates another embodiment of the transmission.

A second form of the invention is illustrated in FIG. 2. This gear arrangement permits placing the gearing to the rear of the torque converter. If desired the gearing may be spaced further from the torque converter to provide an intermediate space. The input shaft 50 is connected by a torque converter housing 51 to the pump 52 of the torque converter. The pump 52 circulates fluid through the first turbine 54 to the second turbine 55 and the stator 56. The first turbine 54 provides torque multiplication throughout the range of operation and the second turbine 55 provides torque multiplication first in a reverse direction and then a forward direction as in the first modification illustrated in FIG. 1. The stator 56 is connected through a oneway brake 57 to a ground sleeve 58 secured to a fixed portion of the transmission housing in order to permit forward rotation and prevent reverse rotation of the stator. The first turbine 54 is connected by a disc 59 and a sleeve shaft 61 to a carrier 62 of the first planetary gear unit. The carrier is connected by a disc 63 to the output shaft 64.

The first planetary gear unit consists of a plurality of pinions 66 mounted on the carrier 62 and meshing with a sun gear 67 fixed to the input shaft 50 and ring gear 68. The second turbine 55 is connected by disc 73, sleeve shaft 72, one-way clutch 71 and a sleeve and disc member 69 to ring gear 68 to provide a forward drive.

The second turbine is connected by the disc 73 and sleeve shaft 72 to the sun gear 74 of the second planetary gear unit. The efficiency may be improved by mounting the blades of the second turbine 55 on a crank 70 to vary the pitch angle of the blades by means of a suitable control system operative during the operation of the torque converter. The second planetary gear unit consists of a carrier 76 having planetary pinions 77 meshing with the sun gear 74 and a ring gear 78 connected by the sleeve shaft 79 and disc 63 to the output shaft 64. The carrier 76 is connected through the one-way brake 81 to a ground sleeve 82 which may be a part of the ground sleeve 58 in order to prevent reverse rotation of the carrier 76. Direct drive may be provided by a direct drive clutch 85 connecting input shaft 50 via housing 51 to hub 59, sleeve shaft 61, carrier 62 to output shaft 64.

In the operation of this transmission the input shaft 50 drives the pump 52 to circulate fluid in a vortex path through the converter torus. The first turbine 54 is connected by disc 59, shaft 61, carrier 62 and disc 63 to the output shaft 64 and thus there is a positive direct drive connection from the first turbine to the output shaft to provide first turbine torque multiplication drive throughout the operation of the transmission. The second turbine 55 is connected by a disc 73 and sleeve shaft 72 to a sun gear 74 and thus in the first range of operation in the low speed ratios drives the ring gear 78 forwardly through a reduction ratio. Since the ring gear 78 is connected by the sleeve shaft 79 and disc 63 to the output shaft, this torque is also transmitted to the output shaft. In the second range of operation at higher speed ratios, the second turbine 55 will gradually stop backward rotation and then begin to move forwardly causing the carrier 76 to move in a forward direction freewheeling at the one-way brake 81. Forward rotation of the second turbine will cause the one-way clutch 71 to engage to provide a drive from the second turbine 55 to the sleeve shaft 72, through one-way clutch 71 and member 69 to the ring gear 68. Since the second turbine drives the ring gear 68 and the input shaft drives the sun gear 67, an additional split torque drive is added to the drive of the first turbine effective on the output shaft 64.

Figure 3:
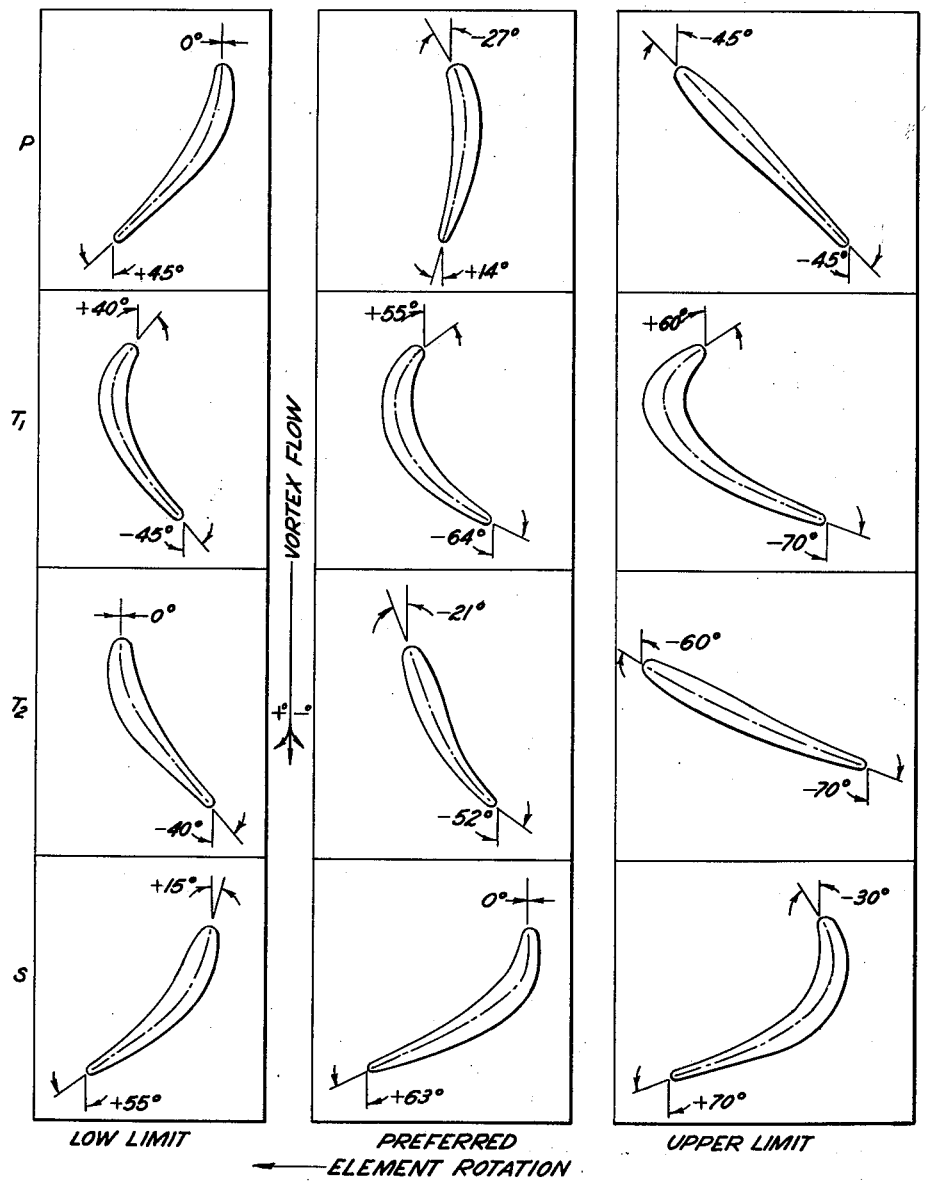

The presently preferred form of this fluid torque converter and gearing transmission employs blades having angles as shown in FIG. 3 for the pump 12 (P), first turbine 14 (T1), second turbine 15 (T2) and stator 16 (S). FIG. 3b shows the preferred blade angles for a medium duty torque converter having the above described gear arrangement employing planetary gear units having about a 2:1 ratio of ring gear to sun gear. However, the blade angles may be varied to meet specific design conditions in the range illustrated by the lower limit FIG. 3a and the upper limit FIG. 3c. The ratio of the planetary gear units may also be varied.

As illustrated in the performance curves, FIG. 4, this torque converter transmission combination will provide an extremely high torque ratio at stall and during the initial low speed ratio range of the range of operation. Thus, in this range the second turbine drives the output shaft through the reduction gear ratio of the first gear unit to provide high torque ratio. Then in the middle range of operation the torque ratio curve, FIG. 4, flattens to provide a slow reduction of torque ratio with increasing speed ratio at a higher efficiency. In this range the second turbine drives through one-way clutch 32 and the first gear unit. When the torque converter reaches the coupling stage, the stator 16 freewheels and there is no further torque multiplication as indicated by the flat portion of the torque ratio curve.

The torque curves, FIG. 5, shows the torque for each of the bladed rotors P, T1, T2, S and the input and output. The negative torque of the second turbine T2 is reversed and multiplied by the second gear unit to provide, when added to the torque of the first turbine, a greatly increased torque ratio at stall and in an initial low speed ratio range of operation. Thereafter, the second turbine during decreasing reverse rotation and forward rotation provides a small but increasing positive torque to ring gear 28 which in conjunction with input torque on sun gear 27 provides a split torque drive partially through the second turbine of the torque converter and partially through the gearing.

The speed of the pump and first and second turbines is illustrated in FIG. 6. The pump speed NP is the same as input shaft speed while the first turbine speed $NT_1$ is the same as the output shaft speed. The second turbine speed curve $NT_2$ shows that it first rotates reversely while driving through the second gear unit in the low range and then rotates forwardly in the middle range and in coupling.

If the gear ratio of the second gear unit, connecting the second turbine to the output shaft, is increased, the change-over point, that is the speed ratio value at which the speed of the second turbine stops increasing in a negative direction, would occur at a lower speed ratio. Conversely, a reduction of ratio of the second gear unit would move the change-over point to a higher speed ratio. Thus, an increase in this gear ratio would provide a higher stall torque ratio and a higher torque ratio over a smaller initial speed ratio range of operation. Conversely, a decrease in this gear ratio would provide a lower stall torque ratio and a lower torque ratio over a longer initial speed ratio range of operation. Since high stall torques are obtained at lower efficiencies than are obtained in the middle and coupling ranges of operation, it is preferred that this initial range of operation be limited to the initial one-fourth or possibly one-third of the speed range which would only be used for high torque acceleration. Since this range is generally used very briefly, the more efficient middle and coupling ranges would be effective during the major portion of normal operation.

The ratio of the first or split torque gear set may also be varied. An increase in the ratio of this gear set would decrease the mechanical torque transmitted by the sun gear 27 considering that the torque of the second turbine remains unchanged. Conversely, on a decrease of this gear ratio, the mechanical torque would increase.

Thus, we have provided a torque converter and gear unit transmission providing at an initial low speed ratio range of operation a high torque multiplication ratio without split torque and at a middle range of operation medium torque multiplication and at a coupling range without torque multiplication. The high torque ratio of the initial range is obtained by combining the forward torque of the first turbine and the reverse torque of the second turbine multiplied by the gear ratio of the second or torque multiplication gear unit. The middle range provides a main first turbine drive augmented by the second turbine and a direct drive from the input providing increased augmentation with increasing speed ratio. In the coupling stage the speed of the rotor units approach a common speed and provide a split torque drive having the highest proportion of direct mechanical torque.

The above-described preferred embodiments are illustrative of the invention which may be modified within the scope of the appended claims.

I claim:

1. In a transmission, an input element, an output element, a fluid torque converter unit having a pump connected to said input element, one turbine, another turbine and a stator, said pump circulating fluid in a path through said turbines and stator, one turbine being connected at a one to one ratio to said output element, means including a torque multiplication gear unit for operatively connecting said another turbine at times to said output element in a torque multiplying ratio to provide a high torque ratio drive and said means also operatively connecting at other times said another turbine and said input element simultaneously to said output element to provide a split torque drive.

2. In a transmission, an input element, an output element, a fluid torque converter unit having a pump connected to said input element, one turbine, another turbine and a stator, said pump circulating fluid in a path through said turbines and stator which have blading to provide one turbine producing maximum torque at converter stall and thereafter gradually reducing the torque output with increasing output to input element speed ratio and another turbine providing a high torque at stall and during an initial speed ratio range and thereafter in a higher speed ratio range providing a low torque, said one turbine being positively connected to said output element, and means including a torque multiplication gear unit for operatively connecting in said initial speed ratio range said another turbine to said output element in a torque multiplying ratio to provide a high torque ratio drive and a split torque gear unit for operatively connecting in said higher speed ratio range said another turbine and said input element simultaneously to said output element to provide a split torque drive.

3. In a transmission, an input element, an output element, a fluid torque converter unit having a pump connected to said input element, a first turbine, a second turbine and a stator, said pump circulating fluid in a path sequentially through said first turbine, second turbine and stator which have blading to provide a first turbine producing maximum torque at converter stall and thereafter gradually reducing the torque output with increasing output to input element speed ratio and said second turbine providing a high torque at stall and during an initial speed ratio range and thereafter in a higher speed ratio range providing a low torque, said first turbine being positively connected to said output element, and means including a torque multiplication gear unit for operatively connecting in said initial speed ratio range said second turbine to said output element in a torque multiplying ratio to provide a high torque ratio drive and a split torque gear unit for operatively connecting in said higher speed ratio range said second turbine and said input element simultaneously to said output element to provide a split torque drive.

4. In a transmission, an input element, an output element, a fluid torque converter unit having a pump connected to said input element, one turbine, another turbine and a stator, said pump circulating fluid in a path through said turbines and stator which have blading to provide one turbine producing maximum forward positive torque at converter stall and thereafter gradually reducing the forward positive torque output with increasing output to input element speed ratio and said another turbine rotating backwardly at stall and during a low range of speed ratios and providing a high negative torque at stall and a gradually reduced negative torque in said low range and thereafter rotating forwardly in a higher range and providing a low positive torque, said one turbine being positively connected to said output element, and means including gear means for operatively connecting said another turbine when and only when reversely rotating to said output element in a torque multiplying ratio to provide a high torque ratio drive and for operatively connecting said another turbine when and only when rotating forwardly and said input element simultaneously to said output element to provide a split torque drive.

5. In a transmission, an input element, an output element, a fluid torque converter unit having a pump connected to said input element, a first turbine, a second turbine and a stator, said pump circulating fluid in a path through said first turbine, second turbine and stator which have blading to provide a first turbine producing maximum forward positive torque at converter stall and thereafter gradually reducing the forward positive torque output with increasing output to input element speed ratio and said second turbine rotating in a backward direction at stall and during an initial range of operation and providing a negative torque at stall and said initial range of operation and thereafter rotating in a forward direction and providing a positive torque, said first turbine being connected to said output element to rotate said output element in one direction of rotation at all times, and means including a torque multiplying gear unit for operatively connecting said second turbine when and only when rotating in one of said directions to drive said output element in a torque multiplying ratio to provide a high torque ratio drive in said one direction of rotation and a split torque gear unit for operatively connecting said second turbine when and only when rotating in the other of said directions and said input element simultaneously to said output element to provide a split torque drive in said one direction of rotation.

6. In a transmission, an input element, an output element, a fluid torque converter unit having a pump connected to said input element, one turbine, another turbine and a stator, said pump circulating fluid in a path through said turbines and stator which have blading to provide one turbine producing maximum forward positive torque at converter stall and thereafter gradually reducing the forward positive torque output with increasing output to input element speed ratio and another turbine rotating backwardly at stall and during an initial range of operation providing a high negative torque at stall and a reducing negative torque in said initial range and thereafter rotating forwardly and providing a low positive torque, said one turbine being positively connected to said output element, and means including a torque multiplying gear unit for operatively connecting said another turbine when and only when reversely rotating to forwardly drive said output element in a torque multiplying ratio to provide a high torque ratio drive and a split torque gear unit for operatively connecting said another turbine when and only when rotating forwardly to said output element and said input element simultaneously to said output element to provide a split torque drive.

7. In a transmission, an input element, an output element, a fluid torque converter unit having a pump connected to said input element, a first turbine, a second turbine and a stator, said pump circulating fluid in a path sequentially through said first turbine, second turbine and stator which have blading to provide a first turbine producing maximum forward positive torque at converter stall and thereafter gradually reducing the forward positive torque output with increasing output to input element speed ratio and said second turbine rotating backwardly at stall and during an initial range of operation providing a high negative torque at stall and a reducing negative torque in said initial range and thereafter rotating forwardly and providing a low positive torque, said first turbine being positively connected to said output element, and means including a torque multiplying gear unit for operatively connecting said second turbine when and only when reversely rotating to forwardly drive said output element in a torque multiplying ratio to provide a high torque ratio drive and a split torque gear unit for operatively connecting said second turbine when and only when rotating forwardly to said output element and said input element simultaneously to said output element to provide a split torque drive.

8. In a transmission, an input element, an output element, a fluid torque converter unit having a pump connected to said input, a first turbine, a second turbine and a stator, said pump circulating fluid in a path sequentially through the first turbine, second turbine and stator which have blading to provide a first turbine producing maximum forward positive torque at converter stall and thereafter gradually reducing the forward positive torque output with increasing output to input element speed ratio and said second turbine initially rotating backwardly and providing negative torque at stall and thereafter rotating forwardly and providing positive torque, a first and a second planetary gear unit each having a carrier member having planetary pinions meshing with a ring gear member and a sun gear member, a one-way brake connecting said carrier of said first planetary gear unit to ground to prevent reverse rotation of said carrier member of said first planetary gear unit, said first turbine being connected to said carrier of said second planetary gear unit, another member of said first planetary gear unit and said output element, a one-way clutch connecting said second turbine for forward drive to another member of said second planetary gear unit, said second turbine being connected to a third member of said first planetary gear unit, and said input element being connected to said pump and the third member of said second planetary gear unit.

9. In a tranmission, an input element, an output element, a fluid torque converter unit having a pump connected to said input, one turbine, another turbine and a stator, said pump circulating fluid in a path through said turbines and stator, a first and a second planetary gear unit each having a carrier member having planetary pinions meshing with a ring gear member and a sun gear member, one turbine being connected to said carrier of said first planetary gear unit, one member of said second planetary gear unit and the output element, a one-way clutch connecting said another turbine for forward drive to another member of said first planetary gear unit, said another turbine being connected to another member of said second planetary gear unit, said input element being connected to said pump and the third member of said first planetary gear unit, and a one-way brake connecting the third member of said second planetary gear unit to ground to prevent reverse rotation of said third member of said second planetary gear unit.

10. The invention defined in claim 9 and said another turbine providing reverse torque relative to said one turbine during one phase of operation and forward torque relative to said one turbine during another phase of operation.

11. The invention defined in claim 9 and said another turbine providing reverse torque driving through said second planetary gear unit during one phase of operation and forward torque relative to said another member of said first planetary gear unit.

12. In a transmission, an input element, an output element, a fluid torque converter unit having a pump connected to said input, a first turbine, a second turbine and a stator, said pump circulating fluid in a path sequentially through said first turbine, second turbine and stator which have blading to provide a first turbine producing maximum forward positive torque at converter stall and thereafter gradually reducing the forward positive torque output with increasing output to input element speed ratio and said second turbine initially rotating backwardly and providing negative torque at stall and thereafter rotating forwardly and providing positive torque, a first and a second planetary gear unit each having a carrier member having planetary pinions meshing with a ring gear member and a sun gear member, said first turbine being connected to said carrier of said first planetary gear unit, one member of said second planetary gear unit and the output element, a one-way clutch connecting said second turbine for forward drive to another member of said first planetary gear unit, said second turbine being connected to another member of said second planetary gear unit, said input element being connected to said pump and the third member of said first planetary gear unit, and a one-way brake connecting the third member of said second planetary gear unit to ground to prevent reverse rotation of said third member of said second planetary gear unit.

13. In a transmission, an input element, an output element, a fluid torque converter unit having a pump connected to said input element, one turbine, another turbine and a stator, said pump circulating fluid in a path through said turbines and stator, a first and a second planetary gear unit each having a carrier member having planetary pinions meshing with a ring gear member and a sun gear member, said one turbine being connected to said carrier of said first planetary gear unit, said ring gear member of said second planetary gear unit and said output element, a one-way clutch connecting said another turbine for forward drive to said ring gear member of said first planetary gear unit, said another turbine being connected to said sun gear member of said second planetary gear unit, said input element being connected to said pump and said sun gear member of said first planetary gear unit, and a one-way brake connecting said carrier member of said second planetary gear unit to ground to prevent reverse rotation of said carrier member of said second planetary gear unit.

14. The invention defined in claim 13 and said another turbine providing reverse torque relative to said one turbine during one phase of operation and forward torque relative to said one turbine during another phase of operation.

15. The invention defined in claim 13 and said another turbine providing reverse torque to drive said sun gear of said second planetary gear unit and through said second planetary gear unit said output element forwardly in one phase of operation.

16. In a transmission, an input element, an output element, a fluid torque converter unit having a pump connected to said input element, a first turbine, a second turbine and a stator, said pump circulating fluid in a path sequentially through said first turbine, second turbine and stator which have blading to provide a first turbine producing maximum forward positive torque at converter stall and thereafter gradually reducing the forward positive torque output with increasing output to input element speed ratio and said second turbine initially rotating backwardly and providing negative torque at stall and thereafter rotating forwardly and providing positive torque, a first and a second planetary gear unit each having a carrier member having planetary pinions meshing with a ring gear member and a sun gear member, said first turbine being connected to said carrier of said first planetary gear unit, said ring gear member of said second planetary gear unit and said output element, a one-way clutch connecting said second turbine for forward drive to said ring gear member of said first planetary gear unit, said second turbine being connected to said sun gear member of said first planetary gear unit, said input element being connected to said pump and said sun gear member of said first planetary gear unit, and a one-way brake connecting said carrier member of said second planetary gear unit to ground to prevent reverse rotation of said carrier member of said second planetary gear unit.

17. In a transmission, an input element, an output element, a fluid torque converter unit having a pump connected to said input element, one turbine, another turbine and a stator, said pump circulating fluid in a path through said turbines and stator which have blading to provide one turbine producing maximum forward positive torque at converter stall and thereafter gradually reducing the forward positive torque output with increasing output to input element speed ratio and another turbine initially rotating backwardly and providing negative torque at stall and thereafter rotating forwardly and providing positive torque, a first and a second planetary gear unit each having a carrier member having planetary pinions meshing with a ring gear member and a sun gear member, one of said turbines being connected to said output element, said output element being connected to said carrier of said first planetary gear unit, and said ring gear member of said second planetary gear unit, a one-way clutch connecting another of said turbines for forward drive to said ring gear member of said first planetary gear unit, said another of said turbines being directly connected to said sun gear member of said second planetary gear unit, said input element being connected to said pump and said sun gear member of the first planetary gear unit, and a one-way brake connecting said carrier member of said second planetary gear unit to ground to prevent reverse rotation of said carrier member of said second planetary gear unit.

18. In a transmission, an input element, an output element, a fluid torque converter unit having a pump connected to said input element, a first turbine, a second turbine and a stator, said pump circulating fluid in a path sequentially through said first turbine, second turbine and stator which have blading to provide a first turbine producing maximum forward positive torque at converter stall and thereafter gradually reducing the forward positive torque output with increasing output to input element speed ratio and said second turbine initially rotating backwardly and providing negative torque at stall and thereafter rotating forwardly and providing positive torque, a first and a secondary planetary gear unit each having a carrier member having planetary pinions meshing with a ring gear member and a sun gear member, said first turbine being connected to said output element, said output element being connected to said carrier of said first planetary gear unit, and said ring gear member of said second planetary gear unit, a one-way clutch connecting said second turbine only for forward drive to said ring gear member of said first planetary gear unit and connected directly to said sun gear member of said second planetary gear unit, said input element being connected to said pump and said sun gear member of said first planetary gear unit, and a one-way brake connecting said carrier member of said second planetary gear unit to ground to prevent reverse rotation of said carrier member of said second planetary gear unit.

19. In a transmission, an input element, an output element, a fluid torque converter unit having a pump connected to said input, one turbine, another turbine and a stator, said pump circulating fluid in a path through said turbines and stator which have blading to provide one turbine producing maximum forward positive torque at converter stall and thereafter gradually reducing the forward positive torque output with increasing output to input element speed ratio and said another turbine initially rotating backwardly and providing negative torque at stall and thereafter rotating forwardly and providing positive torque, a first and a second planetary gear unit each having a carrier member having planetary pinions meshing with a ring gear member and a sun gear member, said one turbine being connected to one member of said first planetary gear unit, one member of said second planetary gear unit and the output element, a one-way clutch connecting said another turbine for forward drive only to another member of said first planetary gear unit, said another turbine being connected to another member of said second planetary gear unit, said input element being connected to said pump and the third member of said first planetary gear unit, and a one-way brake connecting the third member of said second planetary gear unit to ground to prevent reverse rotation of said third member of said second planetary gear unit.

20. In a transmission, an input element, an output element, a fluid torque converter unit having a pump connected to said input, a first turbine, a second turbine and a stator, said pump circulating fluid in a path sequentially through said first turbine, second turbine and stator which have blading to provide a first turbine producing maximum forward positive torque at converter stall and thereafter gradually reducing the forward positive torque output with increasing output to input element speed ratio and said second turbine initially rotating backwardly and providing negative torque at stall and thereafter rotating forwardly and providing positive torque, a first and a second planetary gear unit each having a carrier member having planetary pinions meshing with a ring gear member and a sun gear member, said first turbine being connected to one member of said first planetary gear unit, one member of said second planetary gear unit and the output element, a one-way clutch connecting said second turbine for forward drive to another member of said first planetary gear unit, said second turbine being connected to another member of said second planetary gear unit, said input element being connected to said pump and the third member of said first planetary gear unit, and a one-way brake connecting the third member of said second planetary gear unit to ground to prevent reverse rotation of said third member of said second planetary gear unit.

21. In a transmission, an input element, an output element, a fluid torque converter unit having a pump drivingly connected to said input element, a first turbine connected at all times at a one to one ratio to said output element, a second turbine providing at times negative torque and at times positive torque and a stator, said pump circulating fluid from said pump through said turbines and said stator, one drive means for operatively connecting said second turbine to said output operative in response to negative torque of said second turbine to drive said output element in one direction and responsive to positive torque of said second turbine to operatively disconnect said one drive, and another drive means for operatively connecting said second turbine to said output element operative in response to positive torque of said second turbine to drive said output element in said one direction and responsive to a negative torque of said second turbine to operatively disconnect said another drive.

22. In a transmission; input means; output means; a fluid torque converter unit having a pump drivingly connected to said input means, turbine means including a turbine providing at times negative torque and at times positive torque and a stator; said pump circulating fluid from said pump through said turbine and said stator; split torque drive means having a first input member, a second input member and an output member to provide a split torque connection between said input members and said output member, said second input member operatively driven by said input means and said output member driving said output means, one drive means for operatively connecting said turbine to said output means operative in response to one direction of torque of said turbine to transmit fluid drive to said output means in normal output drive direction and responsive to the opposite direction of torque of said turbine to disconnect said one drive means, and another drive means for operatively connecting said turbine to said first input member operative in response to said opposite direction of torque of said turbine to transmit fluid drive to said first input member to render said another drive means effective to combine torque from said turbine and said input means and deliver a split torque drive to said output means in said normal output drive direction and responsive to said one direction of torque of said turbine to disconnect said another drive means rendering said split torque drive ineffective.

23. The invention defined in claim 22 and said split torque drive transmitting a torque proportional to said positive torque of said turbine.

24. In a transmission, an input element, an output element, a fluid torque converter unit having a pump connectable to said input element, one turbine, another turbine and a stator, said pump circulating fluid in a path through said turbines and stator, a first and second planetary gear unit each having drive means, driven means and reaction means, said one turbine being connected to said first driven means, said second driven means, and said output element, a one-way clutch connecting said another turbine for forward drive to said first drive means, said another turbine being connected to said second drive means, said input element being connected to said pump and said first reaction means and a one-way brake connecting said second reaction means to ground to prevent reverse rotation of said second reaction member.

25. In a transmission, an input element, an output element, a fluid torque converter unit having a pump connectable to said input element, one turbine, another turbine and a stator, said another turbine providing at times torque in one direction and at other times torque in the opposite direction, said pump circulating fluid in a path through said turbines and stator, a first and second planetary gear unit each having drive means, driven means and reaction means, said input element being connected to said pump and said first reaction means, said one turbine being connected to said first driven means, said second driven means, and said output element, and connecting means for connecting said another turbine to said first drive means, for connecting said another turbine to said second drive means, and for connecting said second reaction means to ground to provide drive during rotation of said another turbine in one direction from said another turbine to said first drive means and to provide drive during rotation of said another turbine in the opposite direction from said another turbine to said second drive means.

26. In a transmission, an input element, an output element, a fluid torque converter unit having a pump connectable to said input element, one turbine, another turbine and a stator, said another turbine providing at times torque in one direction and at other times torque in the opposite direction, said pump circulating fluid in a path through said turbines and stator, a first and second planetary gear unit each having drive means, driven means and reaction means, said input element being connected to said pump, said one turbine being connected to said first driven means, said second driven means, and said output element, and connecting means for connecting said another turbine to said first drive means, for connecting said another turbine to said second drive means, and for connecting said second reaction means to ground to provide drive during rotation of said another turbine in one direction from said another turbine to said first drive means and to provide drive during rotation of said another turbine in the opposite direction from said another turbine to said second drive means.

References Cited in the file of this patent

UNITED STATES PATENTS

| 2,280,015 | Tipton | Apr. 14, 1942 |
| 2,297,259 | Speiser | Sept. 29, 1942 |
| 2,383,980 | Lysholm | Sept. 4, 1945 |
| 2,786,365 | Lammerz | Mar. 26, 1957 |
| 2,795,152 | Russell | June 11, 1957 |
| 2,905,025 | Karlsson et al. | Sept. 22, 1959 |